US006837135B2

(12) United States Patent
Michalski

(10) Patent No.: US 6,837,135 B2
(45) Date of Patent: Jan. 4, 2005

(54) PLUNGE SLITTER WITH CLAM STYLE ANVIL ROLLERS

(75) Inventor: Wayne A. Michalski, Butternut, WI (US)

(73) Assignee: Marquip, LLC, Phillips, WI (US)

( * ) Notice: Subject to any disclaimer, the term of this patent is extended or adjusted under 35 U.S.C. 154(b) by 0 days.

(21) Appl. No.: 10/152,501

(22) Filed: May 21, 2002

(65) Prior Publication Data

US 2004/0149105 A1 Aug. 5, 2004

(51) Int. Cl.[7] ............................ B23D 19/00; B26D 1/18
(52) U.S. Cl. ........................... 83/477.2; 83/499; 83/827
(58) Field of Search ....................... 83/508, 658, 477.2, 83/827, 828, 820, 498, 499, 501, 502

(56) References Cited

U.S. PATENT DOCUMENTS 4,643,058 A * 2/1987 Zingler et al. ................. 83/23
4,843,933 A 7/1989 Seki et al.
4,899,630 A 2/1990 Shioya et al.
5,090,281 A 2/1992 Paulson et al.
5,197,366 A 3/1993 Paulson et al.
6,165,117 A 12/2000 Adami

* cited by examiner

*Primary Examiner*—Boyer Ashley
*Assistant Examiner*—Issac N Hamilton
(74) *Attorney, Agent, or Firm*—Andrus, Sceales, Starke & Sawall, LLP

(57) ABSTRACT

An apparatus for slitting a running paperboard web includes a thin high speed rotary slitting blade that is plunged through the moving web and into a slot between a pair of anvil rollers supporting the web on the opposite side. Because the slitting blade and the anvil rollers are vertically separated and pre-positioned before order change, an adjustment apparatus is provided to spread the anvil rollers axially apart to provide an open gap with a large target for blade edge when it is plunged through the web and into the slot. The anvil rollers are then closed against the opposite faces of the blade for running operation. Preferably, the anvil rollers are mounted on brackets hinged together below the rollers to move the opposite upper edges of the rollers between the opened and closed position in the manner of a clam shell. The anvil roller assembly is also adjustable in the machine direction to compensate for reduction in rotary slitting blade diameter with blade wear.

8 Claims, 8 Drawing Sheets

PLUNGE SLITTER WITH CLAM STYLE ANVIL ROLLERS

BACKGROUND OF THE INVENTION

The present invention relates to an apparatus for slitting a moving web of corrugated paperboard or the like and, more particularly, to an anvil roller assembly for supporting the running web below and in cooperation with an upper rotary slitting blade.

Apparatus for longitudinally slitting a continuous running web of corrugated paperboard is well known in the art. Such apparatus typically also includes a related mechanism for simultaneously providing longitudinal score lines in the advancing web, which score lines facilitate subsequent folding in the construction of paperboard boxes. Thus, a combined slitter-scorer utilizes pairs of rotatable cutting tools and scoring tools disposed in the path of the running web with one tool of each pair disposed on each side of the web. Typically, multiple slitting tools are mounted coaxially and spaced laterally across the width of the web and, likewise, multiple scoring tools are also coaxially mounted and spaced laterally across the width of the web.

In accordance with the teaching of prior art U.S. Pat. No. 5,090,281, the moving web is directed through a thin circular blade rotating at high speed with the board supported below the blade by a roller assembly in contact with the underside of the web. Each such roller assembly includes a pair of rollers which are rotatably mounted to provide tangent contact with the underside of the web and to define therebetween a slot which is positioned to receive the lower edge of the high speed rotary cutting blade positioned over the web. These supporting rollers are also sometimes referred to as anvil rollers since they support the paperboard web against the cutting force of the thin, high speed slitting blade.

Prior art U.S. Pat. No. 5,197,366 discloses a roller assembly in which the rollers of each pair are mounted on separate rotational axes displaced from one another by a small angle to define a blade-receiving slot which is downwardly divergent. The rollers of each pair are also biased toward one another to cause the axially adjacent radial edge portions of the rollers at the point of supporting web contact to bear against the faces of the blade received in the slot. Contact between the anvil rollers and opposite blade faces also produces a sharp, high quality cut edge in the paperboard web. The angled anvil roller assembly also minimizes the build up of paperboard adhesive on the rollers. It also minimizes the entry of adhesive, board dust and board scraps into the blade-receiving slot between the rollers. Foreign material that enters the slot is also more readily discharged with roller rotation.

However, the foregoing anvil roller assembly is intended for use primarily in a corrugator in which an order change is facilitated by creating a machine direction gap in the web, thereby permitting repositioning of the slitting tools (and scoring tools) without disengaging or moving the tools from their operative cutting orientation. The split anvil roller assembly with the slitting blade positioned in the slot between the rollers permits the latter to be repositioned by driving the slitting blade tool head and carrying the anvil roller assembly therewith. Because the anvil rollers are always engaged with the rotary cutting blade, proper alignment between the blade and rollers is always maintained, even as their cross machine direction position is changed (as during presence of the gap in the web).

In another type of corrugator, order change is effected by moving the cutting tools out of operative slitting position, repositioning the tools in the cross machine direction to the new order position, and then plunging the tools back into the running web. Preferably, the slitter-scorer will have two separate slitting stations (and two separate scoring stations) whereby the inactive slitting station may be set for the new order such that, when the running order slitting tools are moved out of operative slitting engagement at order change, the already positioned slitting tools on the other axis may be simultaneously plunged into slitting contact with the web. A complicating factor in a no gap order change is that the slitting blade and the anvil roller assembly must be repositioned in the cross machine direction independently of one another, and the slitting blade must re-engage the gap in the anvil rollers as it is plunged back into slitting engagement. Because of this independent repositioning, there may be slight position errors between the slitting blade and the anvil roller slot which could interfere with proper re-engagement.

The present invention is directed to a method and apparatus for opening the slot or gap between the anvil rollers to accept the plunging slitting blade, closing the anvil rollers on the blade with an appropriate force, and permitting the anvil rollers to float in the cross machine direction to self-align with the blade.

SUMMARY OF THE INVENTION

Each anvil roller assembly is supported on linear ways extending in the cross machine direction. Each anvil assembly carries a drive motor to move the roller assembly to a commanded position, dictated by the order to be run, and then locked in place. Alternate means for positioning the anvil roller assembly and the cooperating tool head for the slitting blade, such as robotic placement, could also be used. The anvil roller assembly is also supported on a short linear bearing extending in the machine direction that allows adjustment of the position of the anvil rollers to compensate for blade wear. Directly supporting the anvil roller pair is a pivot mechanism having a horizontal pivot axis extending in the machine direction and positioned on the roller assembly center line. This pivot mechanism supports both halves of the roller assembly in a sort of clam shell manner. The two halves of the roller assembly are independently pivotable on the pivot axis and a separate air cylinder joins the two halves to draw them together on cylinder retraction, thereby closing the gap and bringing the upper edges of rollers into contact with the opposite faces of the slitting blade. As the cylinder is retracted and the rollers pinch on the blade, they automatically align themselves with the blade. The clamping air cylinder imposes equal forces on both sides of the blade, as determined by air pressure and the positioning of the cylinder.

When the anvil roller assembly is repositioned in the cross machine direction and in preparation to receive a slitting blade plunged through the running web and into the slot between the rollers, the air cylinder extends to separate the rollers at the blade entry slot. Adjustable stops on the supporting structure limit the gap between the rollers and precisely center the gap to provide an optimum target for the thin rotary cutting blade as it is plunged into the slot.

DETAILED DESCRIPTION OF THE PREFERRED EMBODIMENT

Figure 1:
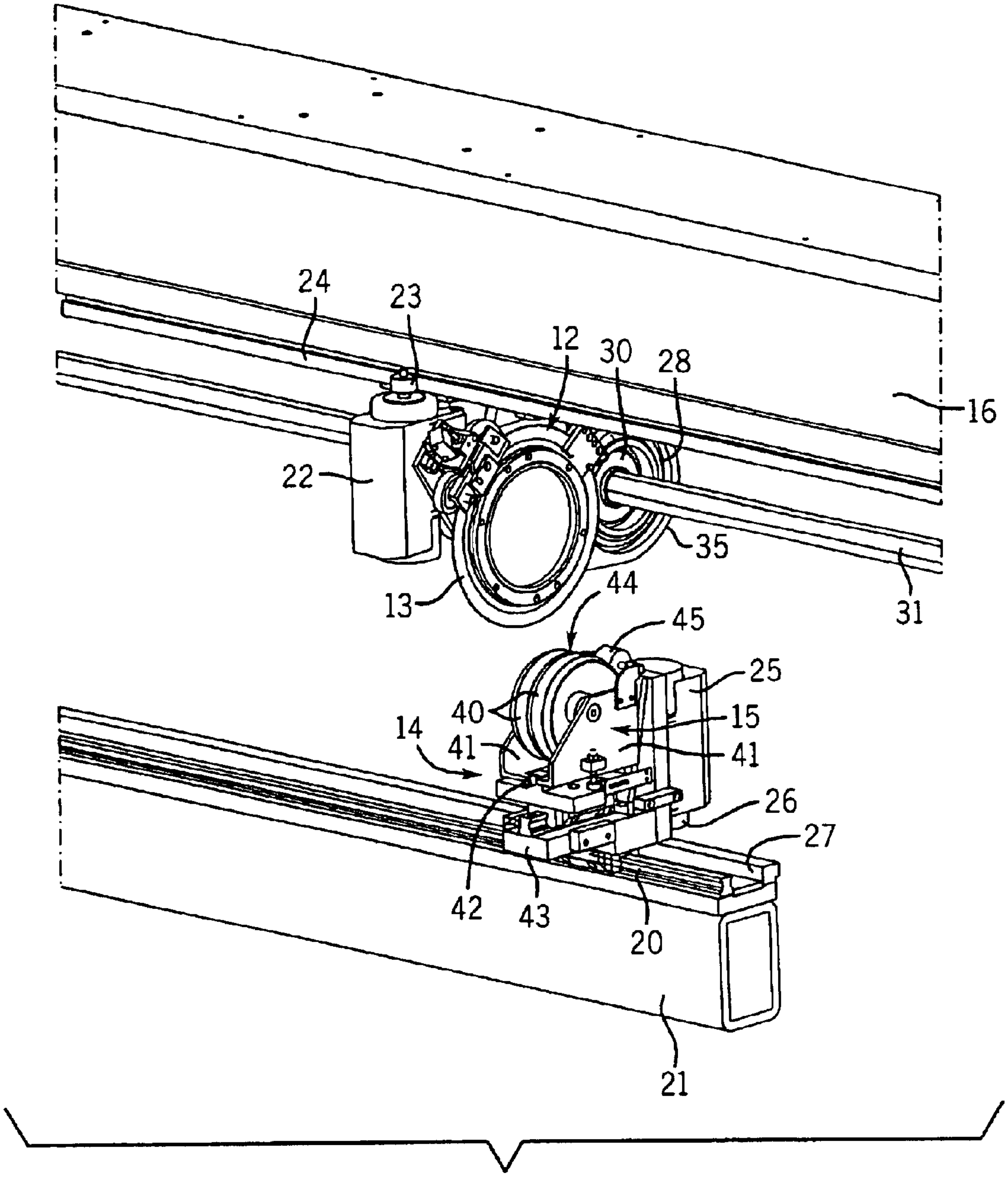
FIG. 1 is an isometric view of an upper tool head carrying a rotary slitting blade and a lower tool head carrying an anvil roller assembly with the upper slitting blade raised and withdrawn from operative slitting engagement.
Figure 2:
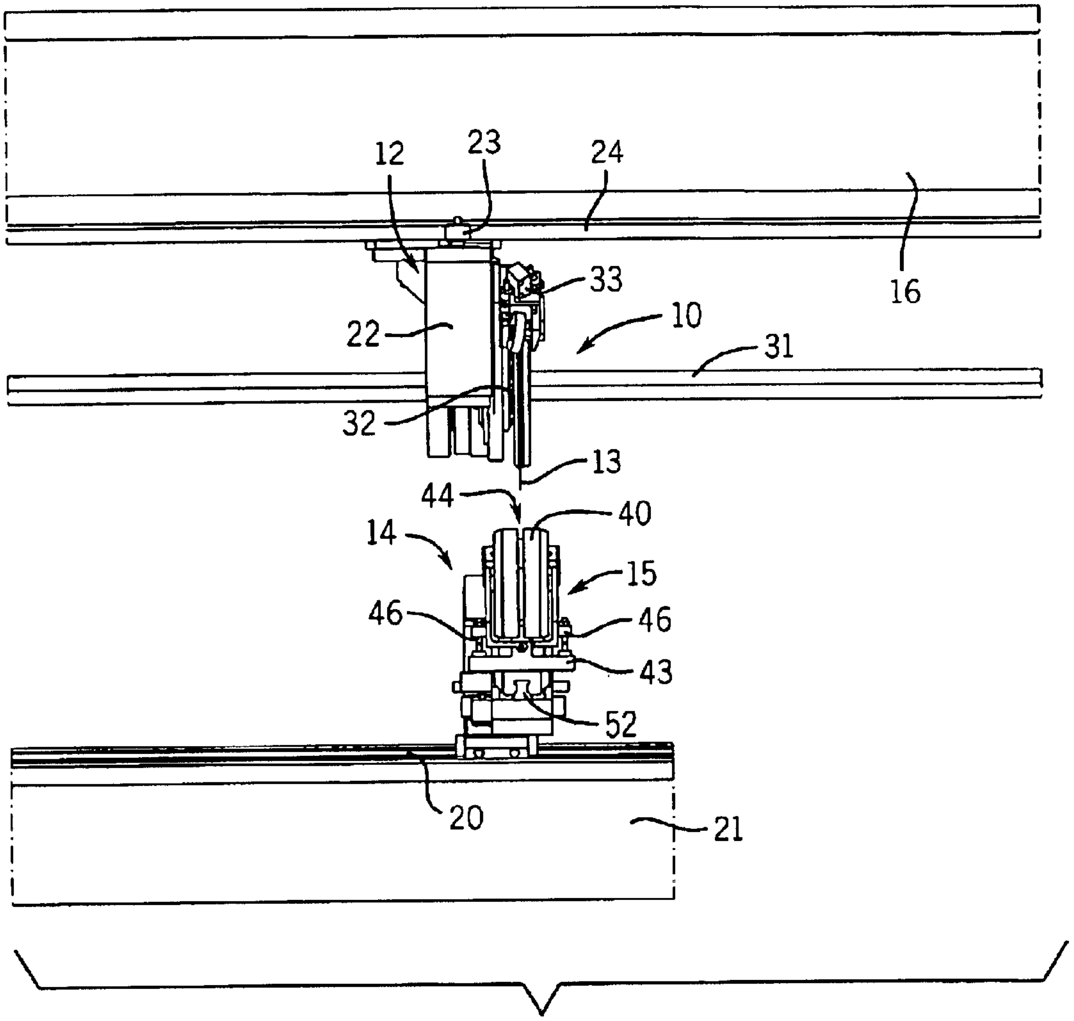
FIG. 2 is a front view of the assembly shown in FIG. 1.
Figure 3:
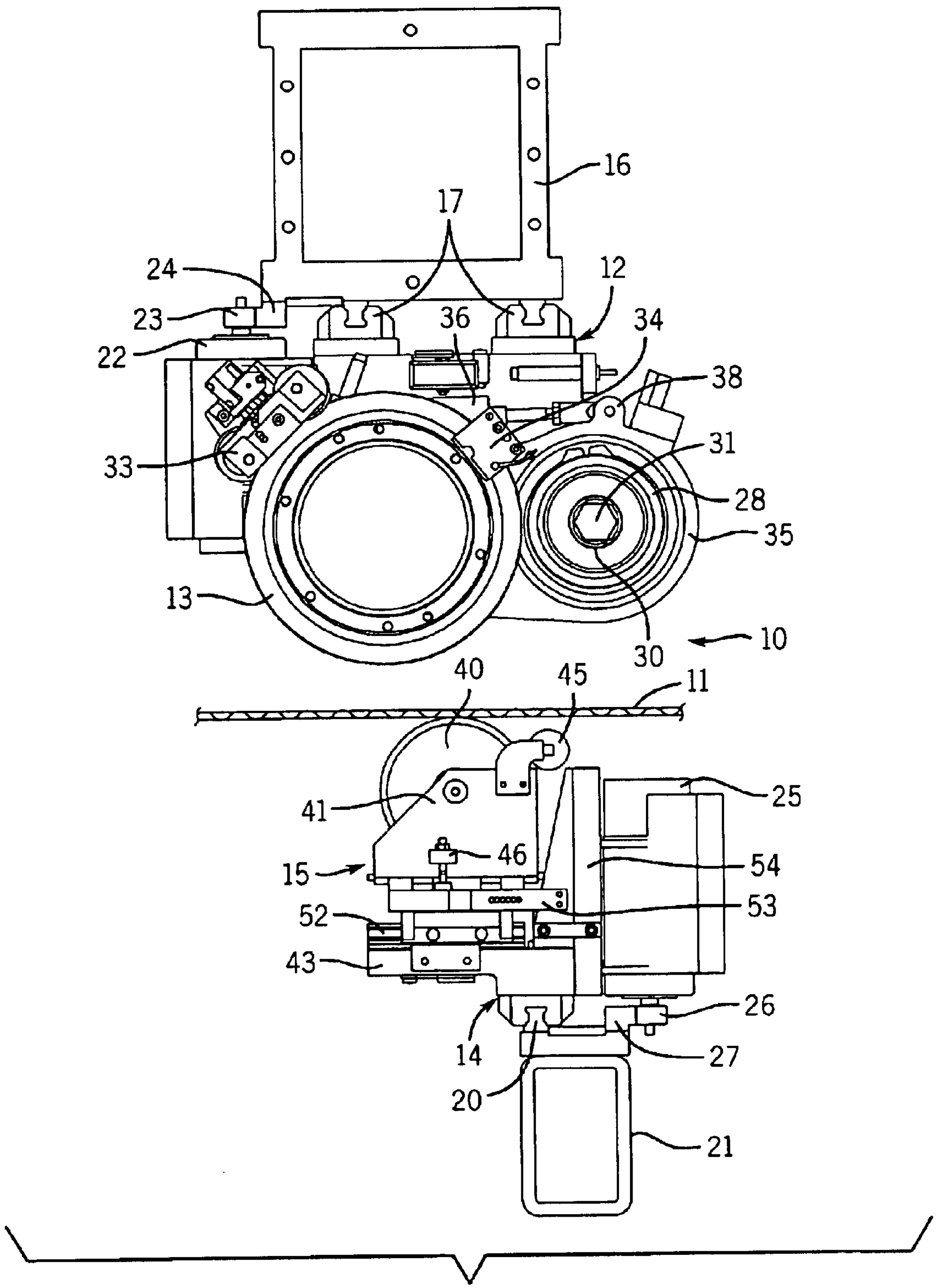
FIG. 3 is a side view of the assembly shown in FIG. 1.

Referring initially to FIGS. 1–3, a web slitting apparatus 10, particularly suited for slitting a moving corrugated paperboard web 11, includes an upper tool head 12 carrying a rotary slitting blade 13 and a lower counterhead 14 carrying an anvil roll assembly 15. The upper tool head 12 is supported for lateral movement in the cross machine direction on a pair of linear bearing ways 17 attached to the underside of an upper box beam 16. Similarly, the lower counterhead 14 is supported for lateral movement in the cross machine direction on a single lower linear way 20 mounted on the upper face of a lower box beam 21.

The upper tool head 12 is moved along the upper linear ways 17 to position the slitting blade 13 by an upper servomotor 22 driving a pinion 23 that engages a linear rack 24 attached to the upper box beam 16 and extending parallel to the linear ways 17.

Figure 4:
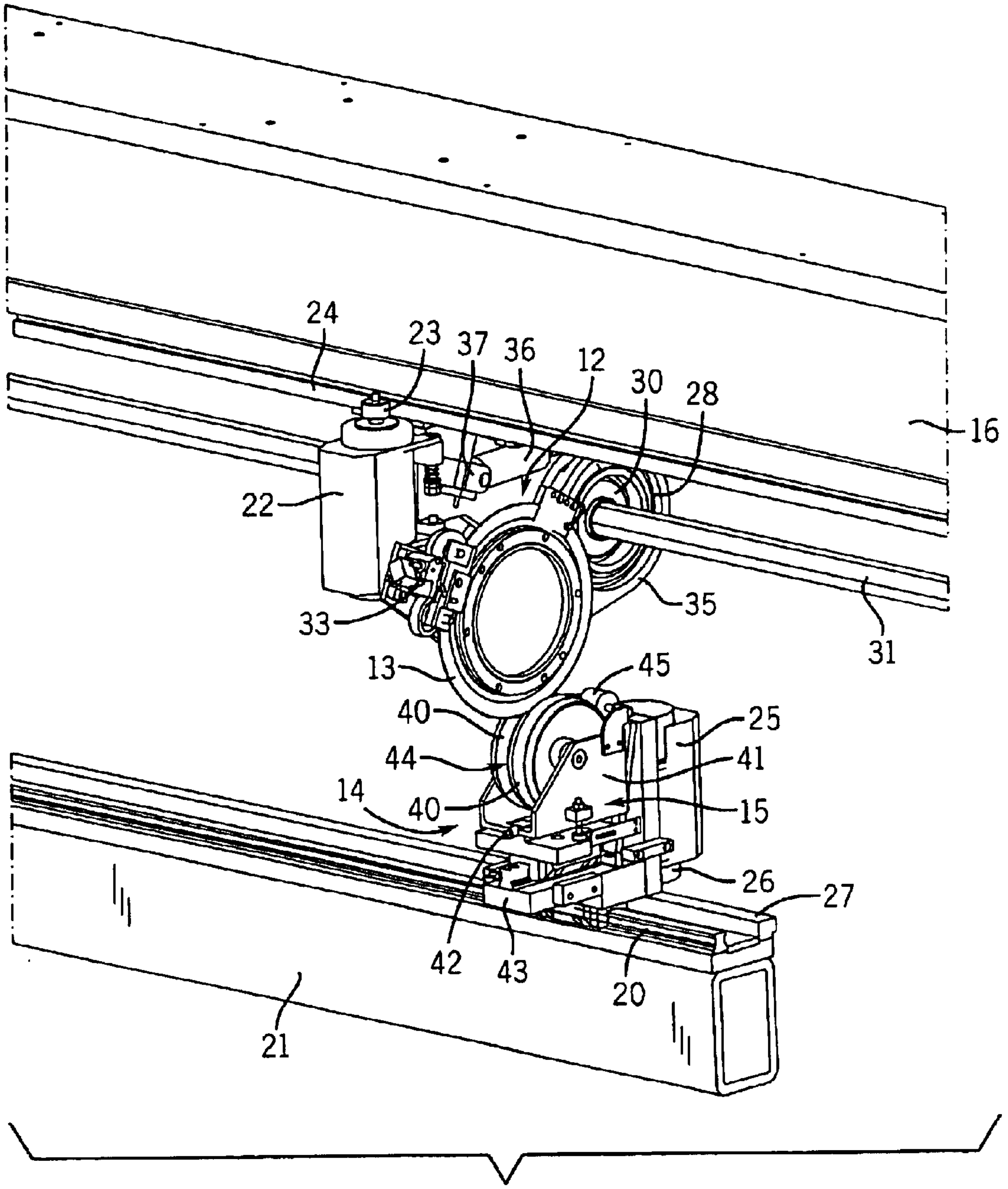
FIG. 4 is an isometric view similar to FIG. 1, but showing the upper rotary slitting tool lowered and plunged into the slot in the lower anvil roll assembly.

In a similar manner, lateral positioning of the anvil roll assembly 15 on the lower counterhead 14 utilizes a lower servomotor 25 driving a pinion 26 that engages a lower linear rack 27 attached to the lower box beam 21 and extending parallel to the lower linear way 20. In a typical slitter-scorer, multiple pairs of an upper tool head 12 and lower counterhead 14 are positioned along their respective box beams 16 and 21 and, utilizing appropriate microprocessor control, each pair of heads may be driven to a selected position for slitting. Furthermore, the system may include another axis of slitting tools and corresponding anvil roller assemblies spaced in the machine direction from the first axis such that, when the tools of one slitting station are in an inoperative position as shown in FIG. 1, the slitting tools and anvil roller assemblies of the other axis are in their operative slitting positions as shown in FIG. 4.

Figure 7:
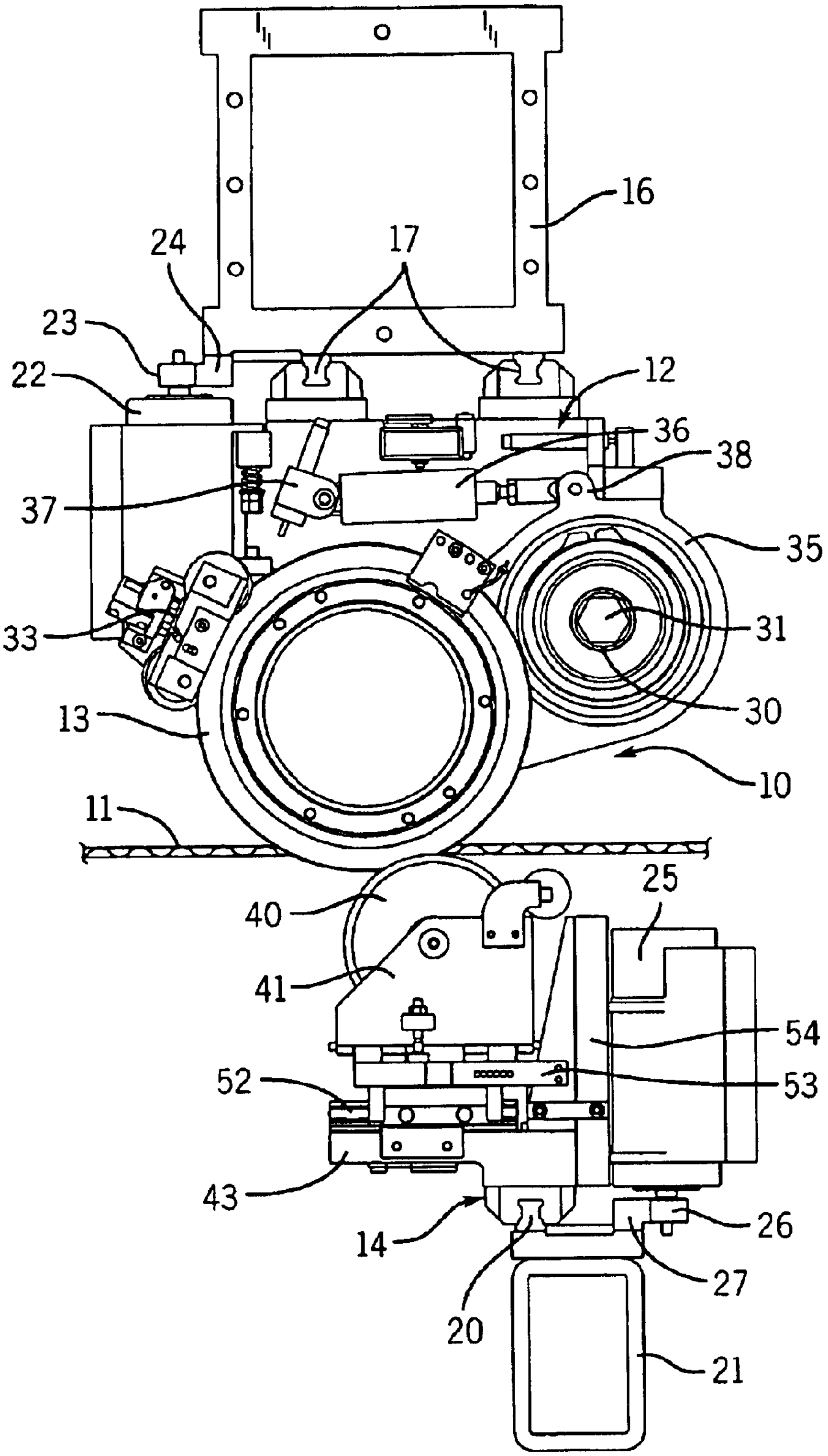
FIG. 7 is a side elevation view of FIGS. 4–6.

Each of the upper tool heads 12 carries a rotatable drive sprocket assembly 28 that includes a center drive hub 30 having a hexagonal through bore that receives a hexagonal drive shaft 31 extending the full width of the machine. The drive shaft 31 is supported at one end in a suitable bearing assembly and at the other end in a drive (not shown) in a manner known in the prior art. Rotary slitting blade 13 includes a driven sprocket assembly 32 connected with a suitable drive belt (not shown) to the drive sprocket 28. The hexagonal drive shaft 31 is thus operative to simultaneously drive all of the rotary slitting blades 13 mounted on the common axis. In a manner known in the prior art, the upper tool head 12 may also carry a blade sharpener 33 for on-the-fly sharpening, as well as a contact blade lubricator 34. The entire rotary slitting blade and driven sprocket assembly 32 is carried on a rotatable collar 35 centered on and rotatable about the drive shaft 31. Rotation of the collar 35 and thus the slitting blade 13 about the axis of the drive shaft 31 is provided by a plunge cylinder 36 secured by its cylinder end to the upper tool head 12 by a mounting clevis 37 and having its rod end attached to a collar clevis 38. In FIG. 3, the plunge cylinder 36 is extended causing the collar 35 to rotate in a clockwise direction thereby carrying the slitting blade 13 upwardly away from the web 11. When the plunge cylinder 36 is retracted, the collar 35 rotates about the drive shaft 31 in a counterclockwise direction, causing the rotary slitting blade 13 to plunge through the moving paperboard web 11 and to be received in a slot in the anvil roller assembly 15 (see FIG. 7), in a manner to be described in greater detail below.

Figure 6:
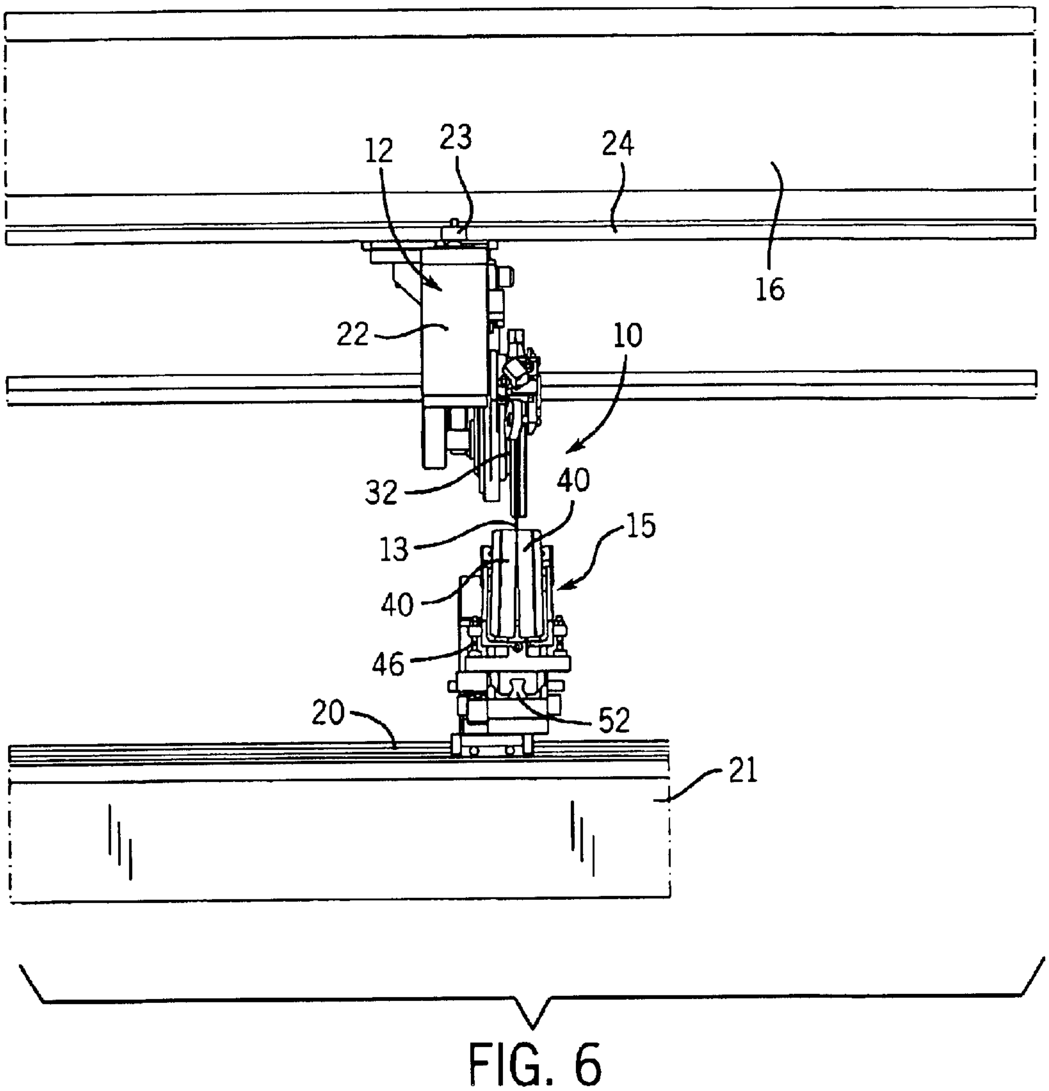
FIG. 6 is a front view similar to FIG. 5, but showing the anvil roll pair closed against the opposite faces of the slitting blade.
Figure 8:
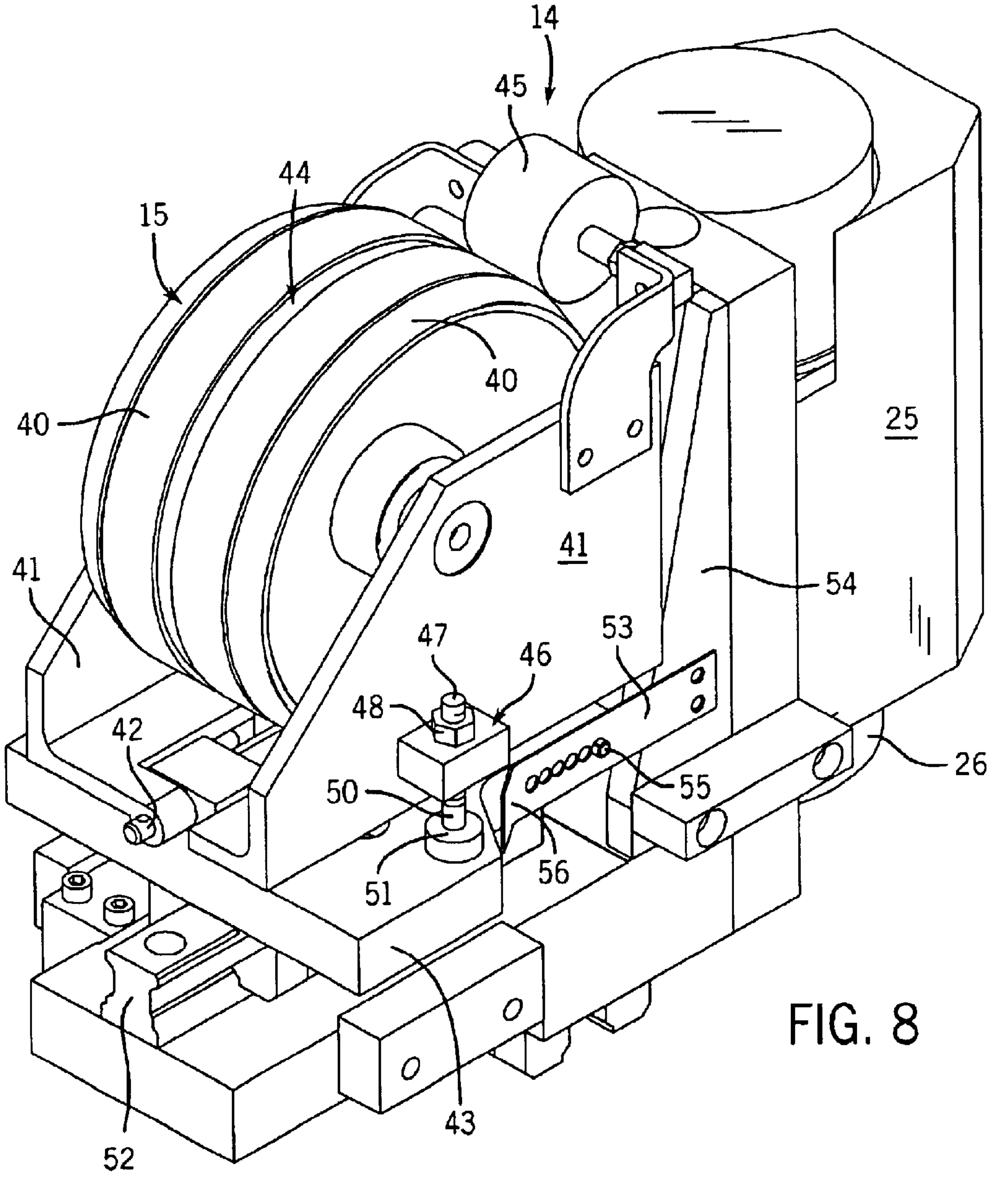
FIG. 8 is an enlarged isometric view of the anvil roller assembly.

Referring again to FIGS. 1–3, the anvil roller assembly 15 mounted on the lower counterhead 14 includes a pair of anvil rollers 40 each of which is rotatably mounted by its laterally outside face to a roller mounting bracket 41. As best seen in FIGS. 1, 2 and 8, each mounting bracket 41 is generally L-shaped and positioned such that lower horizontal legs of the brackets 41 are joined by a horizontal hinge-like pivot 42 carried on a horizontal base plate 43. The anvil rollers 40 are spaced axially apart to define therebetween a blade entry slot 44. The slot 44 is shown in its fully open position in FIG. 2. The mounting brackets 41 are also interconnected near their upper edges by a small air cylinder 45 which is operative to cause the brackets and anvil rollers mounted thereon to rotate about the pivot 42 such that the upper portion of the slot 44 can be closed against the opposite faces of the slitting blade 13, as shown in FIG. 6. The benefits accruing from operating the anvil rollers 40 in slight contact with the faces of the slitting blade 13 are known from U.S. Pat. No. 5,197,366 , identified above, and described in greater detail therein and the description of which is incorporated by reference herein. In that prior art patent, however, the anvil roller pair is maintained in continuous contact with the faces of the slitting blade and the blade is maintained in the slot such that, at order change, a gap must be created in the web to allow simultaneous repositioning of each slitting blade/anvil roller assembly.

Figure 5:
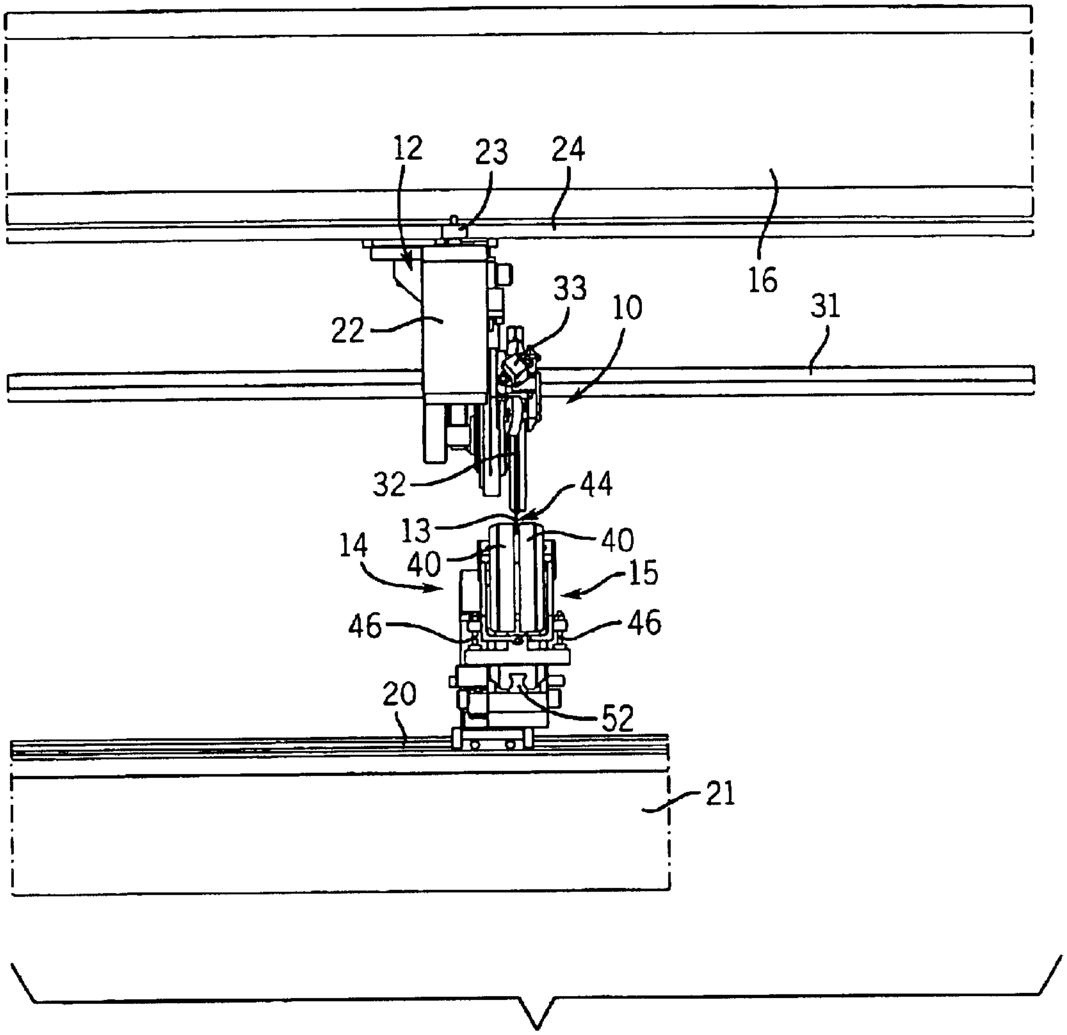
FIG. 5 is a front view of the assembly shown in FIG. 4 with the slot in the anvil roll pair opened for receipt of the slitting blade.

In accordance with the present invention, the upper tool head 12 and the lower counterhead 14 are separately repositioned while the web 11 continues to run therebetween. Because the repositioning of each tool head is independent of the other, there may be slight position errors between the blade edge and the center of the pair of rollers 40. In accordance with the present invention, therefore, the rollers 40 mounted on the roller brackets 41 are pivoted to open the slot 44 by pivoting about the hinge-like pivot 42 in a manner similar to opening a clam shell. The open slot provides a larger target such that when the plunge cylinder 36 is retracted, the rotary slitting blade 13 will rotate downwardly and readily enter the open slot 44 after plunging through the running web 11, as best seen in FIG. 5. When the small air cylinder 45 is retracted the upper edges of the mounting brackets 41 and anvil rollers 40 mounted thereon are drawn together to close on the opposite faces of the slitting blade 13, as best seen in FIG. 6. Because of the pivotal mounting of the brackets 41 on the pivot 42, the anvil rollers 40 automatically align themselves with the blade and equal force is applied to both sides of the blade. The force is determined by the air pressure and the geometry of the system.

To limit the opening movement of the mounting brackets 41 and thus limit the gap created between the upper edges of the anvil rollers 40, adjustable stops 46 are provided between each mounting bracket 41 and the base plate 43.

Each stop 46 includes a pin 47 threadably mounted in a nut 48 secured to the outside face of the mounting bracket 41. The pin has a hardened lower end 50 that engages a hardened bearing pad 51 on the base plate 43. In addition to limiting the amount of opening movement between the anvil rollers 40, the adjustable stops also act to precisely center the gap to provide the best target for the slitting blade to enter.

As the rotary slitting blade 13 wears in use, the blade OD defining the cutting edge is gradually reduced. However, it is imperative that the blade edge be retained within the slot 44 between the anvil rollers 40 in order to maintain proper alignment and good slit quality. If adjustment is not made, reduction in the cutting blade edge diameter will result in the blade edge being slowly withdrawn from the slot. To compensate for blade wear and to maintain a consistent depth of penetration of the blade edge into the slot, the base plate 43 supporting the anvil roller assembly 15 is mounted on a short machine direction linear way 52 for slidable movement along the linear way such that, with blade edge wear, the vertical centerline of the anvil rollers 40 may be moved in the downstream direction to approach the vertical centerline of the rotary slitting blade 13, thereby maintaining a consistent amount of blade penetration into the anvil slot 44. Adjustment is accomplished easily by providing a spring steel tab 53 attached at one end to a stationary back plate 54 of the lower counterhead 14. The spring tab includes a horizontally extending alignment pin 55 which is adapted to engage one of a series of horizontally spaced holes in the side of the base plate 43. An offset end 56 on the opposite end of the spring tab 53 is engaged by the operator to bend the tab outwardly and withdraw the alignment pin 55 from the hole in the base plate 43. While the pin is withdrawn, the base plate and attached anvil roller assembly 15 may be slid along the short linear way 52 to a position in which the desired amount of slitting blade edge within the slot is restored. The spring tab 53 is then released to allow the alignment pin 55 to enter the hole closest to the desired position.

Although the location of the horizontal pivot 42 for the roller mounting brackets 41 centered vertically below the anvil rollers 40 is preferred, the pivot point could be located elsewhere and at other than a horizontal orientation with appropriate adjustment in the construction of the mounting brackets 41. The adjustable stops 46 are preferably set to provide a maximum gap in the blade entry slot 44 of about ¼ inch (about 6 mm). At this point, anvil rollers 40 are oriented with their rotational axes substantially horizontal and coaxial. When the air cylinder 45 is retracted to close the gap, the axes of the anvil rollers are each moved about 1° to 2° from the horizontal to close upon the opposite faces of the annular rotary slitting blade 13 which may have a thickness, for example, in the range of 0.035 to 0.045 inch (0.9 to 1.1 mm).

I claim:

1. In an apparatus for slitting a running paperboard web, said apparatus including an annular rotary cutting blade positioned with its axis of rotation over the web and having a peripheral cutting edge defined by opposite blade faces extending downwardly through the path of the web to slit the web in the direction of web travel, and an anvil roll assembly under the web including a pair of anvil rollers positioned to support the web at the point of the slit, said rollers defining therebetween a slot for receiving the blade edge therein, the improvement comprising:

means for supporting said anvil rollers to permit the slot to be opened to receive the blade edge and closed to cause the anvil rollers to bear against the opposite blade faces; a first actuator interconnecting the rollers and operable to open and close said slot; and an upper support for said cutting blade including a blade drive and a blade support head mounted for movement between an upper inoperative position with the blade out of engagement with the web and the anvil rollers and a lower operative position with the blade in slitting engagement with the web and with the blade edge extending into the slot; and, a second actuator interconnecting the support structure and the blade support head operable to move the blade support head between the upper and lower positions.

2. In an apparatus for slitting a running paperboard web, said apparatus including a thin annular rotary cutting blade positioned with its axis of rotation over the web and having a peripheral cutting edge defined by opposite blade faces extending downwardly through the path of the web to slit the web in the direction of web travel, and an anvil roll assembly under the web including a pair of anvil rollers positioned to support the web at the point of the slit, said rollers defining therebetween a slot for receiving the blade edge therein, the improvement comprising:

a lower support arrangement for said anvil rollers including a mounting bracket for each roller, a pivot joint joining the brackets for hinged movement to permit the slot to be opened to receive the blade edge and closed to cause the anvil rollers to bear against the opposite blade faces; a first actuator interconnecting the brackets, spaced from the pivot joint and operable to open and close said slot; and an upper support structure for said cutting blade including a blade drive and a blade support head mounted for generally vertical movement between an upper inoperative position with the blade out of engagement with the web and the anvil rollers and a lower operative position with the blade in slitting engagement with the web and with the blade edge extending into the slot; and, a second actuator interconnecting the support structure and the blade support head operable to move the blade support head between the upper and lower positions.

3. The apparatus as set forth in claim 2 wherein said mounting brackets comprise a pair of L-sections, each section having a lower flange and a side flange, said pivot joint connecting adjacent edges of said lower flanges, and said side flanges each carrying an anvil roller.

4. The apparatus as set forth in claim 3 wherein said first actuator interconnects the side flanges of said L-sections.

5. The apparatus as set forth in claim 2 wherein said lower support arrangement is carried on a base plate and connected thereto at said pivot joint.

6. The apparatus as set forth in claim 5 including a stop extending between each mounting bracket and the base plate to limit movement of said first actuator to open said slot.

7. The apparatus as set forth in claim 6 wherein said stops are adjustable.

8. The apparatus as set forth in claim 5 wherein said base plate is mounted for movement along a linear track extending parallel to the direction of web travel, and including an adjustable lock for selectively adjusting the position of the lower support arrangement along said track and for locking the same in a selected position.

* * * * *